United States Patent [19]

Stingel, Jr. et al.

[11] Patent Number: 5,236,104
[45] Date of Patent: Aug. 17, 1993

[54] MULTIPLE PRESSURE CONTAINER STORAGE AND RETRIEVAL APPARATUS

[75] Inventors: Frederick J. Stingel, Jr., 872 Lakeside Dr., North Palm Beach, Fla. 33408; Frederick J. Stingel, III, Palm Beach Gardens, Fla.

[73] Assignee: Frederick J. Stingel, Jr., North Palm Beach, Fla.

[21] Appl. No.: 878,709

[22] Filed: May 1, 1992

[51] Int. Cl.$^5$ .................. G07F 11/06; G07F 11/08
[52] U.S. Cl. ...................... 221/75; 221/108; 414/276; 193/27; 312/42
[58] Field of Search ............ 221/75, 22, 311, 204, 221/205, 107, 108, 109; 193/27, 28, 35 R, 38, 40; 414/267, 276, 285; 312/42

[56] References Cited

U.S. PATENT DOCUMENTS

| | | |
|---|---|---|
| 296,600 | 4/1982 | Norwood . |
| 342,433 | 5/1986 | Fischer . |
| 409,806 | 8/1989 | Schureman . |
| 1,034,618 | 8/1912 | Holcombe . |
| 2,701,077 | 2/1955 | Palmer . |
| 3,437,235 | 4/1969 | Guerra . |
| 3,477,560 | 11/1969 | Broser . |
| 3,608,776 | 9/1971 | Moe et al. . |
| 4,273,253 | 6/1981 | Tanaka et al. . |
| 4,485,910 | 12/1984 | Tabler . |
| 4,621,745 | 11/1986 | Grace . |
| 5,111,963 | 5/1992 | Grace . |

FOREIGN PATENT DOCUMENTS

| | | |
|---|---|---|
| 453068 | 11/1927 | Fed. Rep. of Germany . |
| 1045134 | 11/1958 | Fed. Rep. of Germany . |
| 1144186 | 2/1963 | Fed. Rep. of Germany . |
| 521862 | 1/1977 | Japan . |
| 54-38075 | 3/1979 | Japan . |
| 521191 | 9/1976 | U.S.S.R. . |
| 1044183 | 9/1966 | United Kingdom . |
| 1414022 | 11/1975 | United Kingdom . |
| 2047666 | 12/1980 | United Kingdom . |

OTHER PUBLICATIONS

Allan Harvey, "Automatic Routing and Dispatching to Trucks and Trailers," Flow Magazine, May 1956, pp. 110 and 142.

Ordermatic Bulletin No. 376 "A Guide to Automated Order Selection System."

Autoque Brochure–Cybernated Automation Corporation.

Primary Examiner—Joseph E. Valenza
Assistant Examiner—Dean A. Reichard
Attorney, Agent, or Firm—Quarles & Brady

[57] ABSTRACT

A container storage and retrieval apparatus includes opposing stacks of vertically staggered shelf assemblies. Each shelf assembly includes a shelf pivotally mounted to a support structure and movable between at least an upwardly tilted, receiving position and a downwardly tilted, discharge position. Fluid-operated structure is provided to raise the shelf between at least the downwardly tilted, discharge position and the upwardly tilted, receiving position. A higher pressure fluid source and lower pressure fluid source are provided. Container indicator switching structure connects the raising structure to the higher pressure fluid source if a container is not present on the shelf, and to the lower pressure source if a container is present on the shelf. Transfer control structure is operatively connected between the shelf and the next lower shelf, and is adapted to prevent the lowering of the shelf to the discharge position unless the next lower shelf is in the receiving position.

18 Claims, 7 Drawing Sheets

MULTIPLE PRESSURE CONTAINER STORAGE AND RETRIEVAL APPARATUS

BACKGROUND OF THE INVENTION

Field of the Invention

This invention relates generally to container storage and retrieval apparatus, and more particularly to vertically accumulating container storage and retrieval apparatus.

Description of the Relevant Art

Vertically accumulating container storage and retrieval apparatus is shown by Grace, U.S. Pat. No. 4,621,745. This construction consists of opposing stacks of vertically staggered shelves which are pivotable between an upwardly tilted, receiving position, a storage position, and a downwardly tilted, discharge position. Movement of the shelves is controlled such that an upper shelf cannot pivot downwardly to the discharge position unless the next lower shelf is in the upwardly tilted, receiving position. Containers travel down the stack of opposing shelves in zig-zag fashion to come to rest at the lowest unoccupied shelf. Grace, U.S Pat. No. 5,111,963, discloses a two-position shelf assembly which increases efficiency in some applications. There is a continuing need for improved container storage and retrieval apparatus which are adaptable to special situations such as light product weight, variable product weight and heavy product weight.

SUMMARY OF THE INVENTION

It is an object of the invention to provide container storage and retrieval apparatus which requires less floor space than traditional container storage apparatus.

It is a further object of the invention to provide container storage and retrieval apparatus which is functional with very light and very heavy products.

It is still another object of the invention to provide a container storage and retrieval apparatus which can be adapted to variable container weights.

These and other objects are accomplished by container storage and retrieval apparatus including opposing stacks of vertically staggered shelves. The shelves are pivotable between at least an upwardly tilted, receiving position and a downwardly tilted, discharge position. One or more intermediate storage positions are also possible. The shelves of the opposing stacks are oriented to permit the sliding transfer of containers from an upper shelf in the discharge position to the next lower shelf in the receiving position.

Fluid-operated raising structure, such as a pneumatic or hydraulic cylinder, is utilized to raise the shelf from the discharge position to the receiving position. The raising structure is connectable to a higher pressure fluid source and to a lower pressure fluid source. The lower pressure source can be an exhaust or drain for fluid from the raising structure. Switching structure is provided for switching between the lower pressure source and the higher pressure source according to whether or not a container is present on the shelf. The higher pressure is used to raise and maintain the shelf in the receiving position Upon reception of a container, the connection is switched to the lower pressure source to permit the lowering of the shelf and the container.

A transfer stop is operatively connected between each shelf and the next lower shelf The transfer stop prevents the lowering of a shelf to the discharge position unless the next lower shelf is in the receiving position. The transfer stop can take several alternative forms. In a presently preferred embodiment, a connecting rod extends from the next lower shelf to a movable stop member that is associated with the upper shelf. A transfer stop member is positionable to block the movement of a portion of the shelf, and preferably a cam plate fixed to the shelf, to prevent the lowering of the shelf to the discharge position. A portion of the transfer stop member can define an intermediate storage position, as the shelf can fall after a container is received to the position where the transfer stop member is contacted. Movement of the next lower shelf to the receiving position moves the connecting rod and the transfer stop member out of engagement with the cam plate of the upper shelf, to permit lowering of the upper shelf to the discharge position.

Latching structure can also be provided to secure the shelf in the receiving position until a container has been fully received on the shelf. The latching structure preferably includes a latch arm pivotally mounted to the shelf. A portion of the latch arm can engage structure fixed to the support structure or another fixed object to retain the shelf in the receiving position. The latch arm disengages when a container is received on the shelf. Preferably, a container transferred to the shelf will strike the latch arm, causing it to move from its seat to permit lowering of the shelf.

Another portion of the cam plate can engage another portion of the transfer stop member to limit the upward movement of the shelf. The transfer stop member can have two seats for engagement with the cam plate. A first seat defines the intermediate storage position. A second seat defines the lower limit of the downwardly tilted, discharge position.

BRIEF DESCRIPTION OF THE DRAWINGS

The attached drawings depict presently preferred embodiments of the invention. The drawings should not, however, be viewed as limiting the invention to the precise arrangements and instrumentalities shown, wherein:

FIG. 1-A is a side elevation, partially broken away and partially in phantom, and depicting a first sequence of operation.

FIG. 1-B is a side elevation including schematic representation of fluid operated controls, and depicting the first sequence of operation.

FIG. 2-A is a side elevation similar to FIG. 1-A, and depicting a second sequence of operation.

FIG. 2-B is side elevation similar to FIG. 1-B and depicting the second sequence of operation.

FIG. 3-A is a side elevation similar to FIG. 1-A and depicting a third sequence of operation.

FIG. 3-B is a side elevation similar to FIG. 1-B, and depicting the third sequence of operation.

DETAILED DESCRIPTION OF THE PREFERRED EMBODIMENTS

Figure 1A:
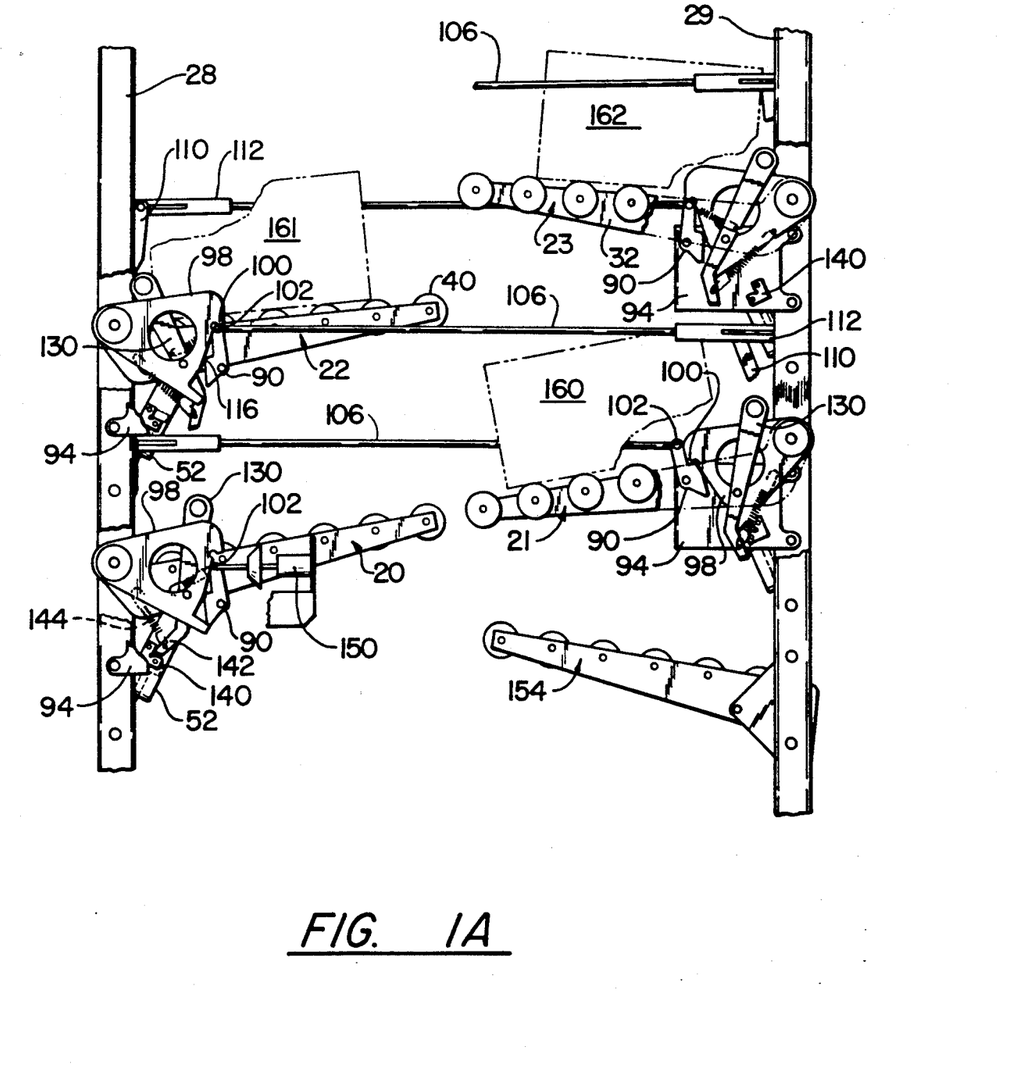

There are shown in the drawings a plurality of shelf assemblies including shelves 20–23. Each shelf is pivotally mounted to vertical support structure such as the posts 28, 29. The shelves 20–23 are pivotable between at least an upwardwardly tilted, receiving position and a downwardly tilted, discharge position, as illustrated respectively by the shelves 20, 21 in FIG. 1-A.

Figure 4:
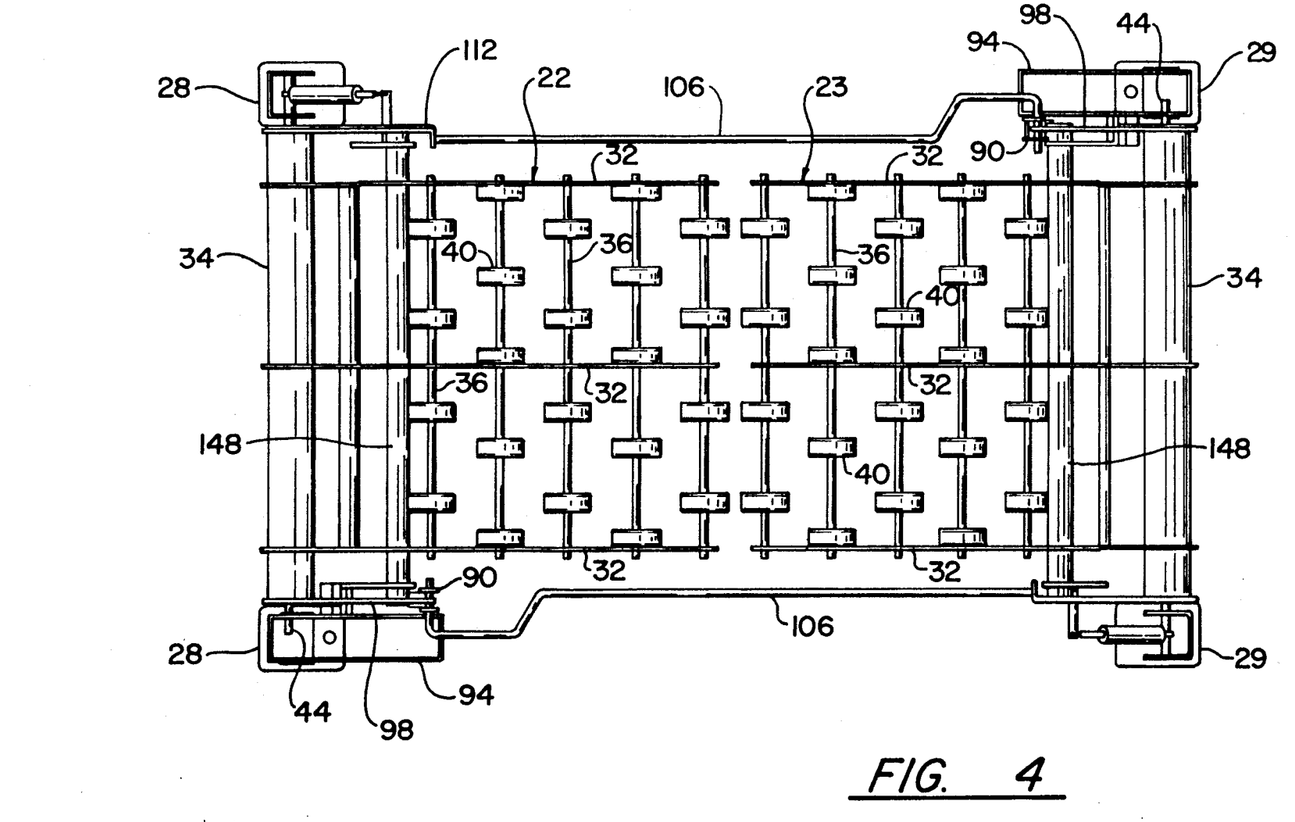
FIG. 4 is a plan view.

The construction of the shelves can vary widely. In one construction, each shelf is comprised of a series of parallel support plates 32 (FIG. 4) which are joined at an axle 34. The axles 34 can be mounted to the posts 28, 29 about mounting pins 44. Cross bars 36 are mounted through the support plates 32 and can have a plurality of rollers 40 to assist the transfer of containers onto or off of the shelves.

The shelves are fixed to the support structure so as to be opposing and vertically staggered as shown in the drawings. A shelf in the downwardly tilted, discharge position is substantially aligned with the next lower shelf in the upwardly tilted, receiving position so as to permit the transfer of a container from the shelf to the next lower, opposing shelf.

Figure 1B:
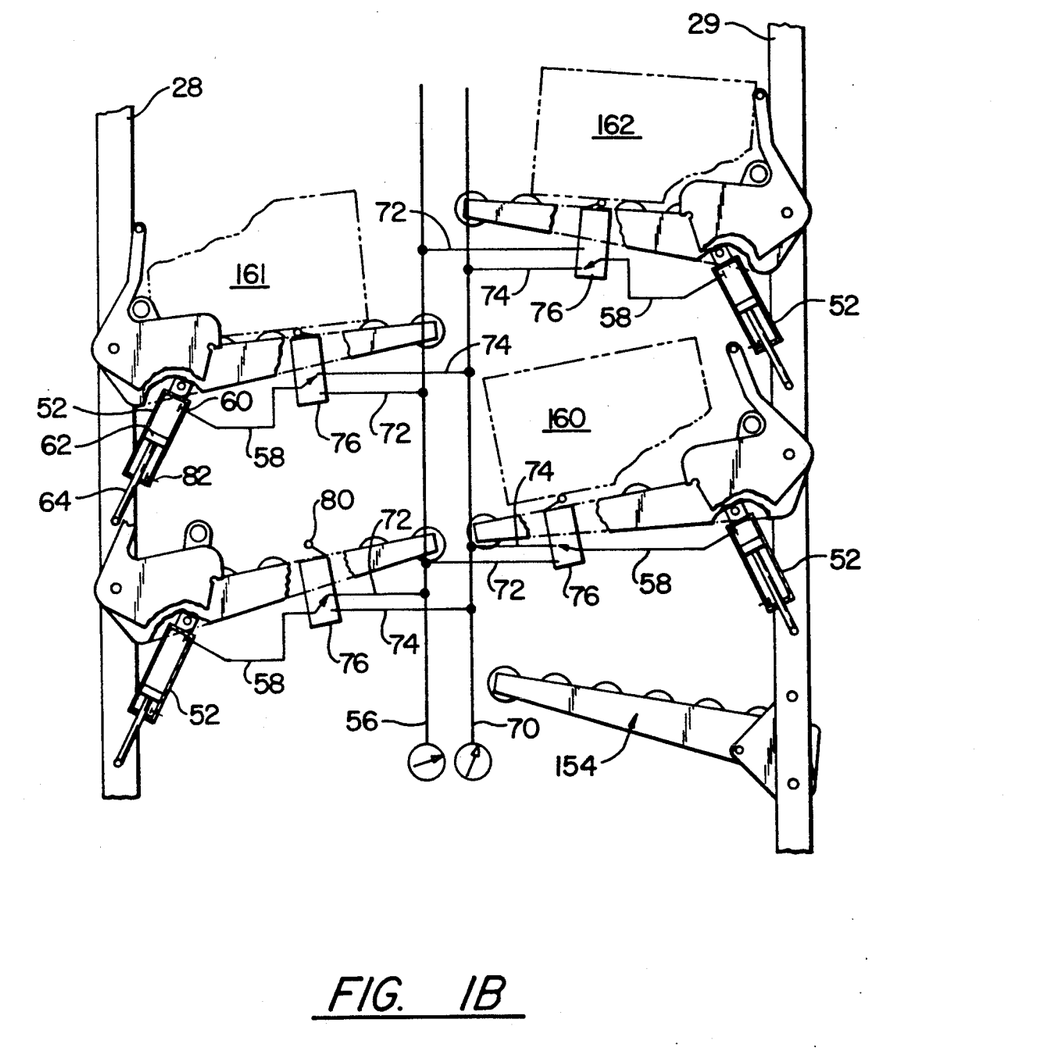

Fluid-operated raising structure is provided to raise the shelves from the discharge position to the receiving position. The fluid-operated structure can be selected from a number of alternatives, including structure powered by either pneumatic or hydraulic pressure. Pneumatic pressure is presently preferred. The raising structure is preferably a pneumatic cylinder 52 which is mounted at one end to a shelf, and at another end to fixed structure such as the support posts 28, 29. A source of high pressure fluid 56 is provided to supply raising pressure to the cylinder 52. In one embodiment, a path 58 provides a high pressure fluid to a port 60 of the cylinder 52 (FIG. 1-B). High pressure fluid entering the port 60 drives a piston 62 and piston arm 64 to extend the cylinder 52 and raise the corresponding shelf. A lower pressure source 70 can be provided as a drain or exhaust for high pressure fluid from the cylinder 52 to permit lowering of the shelf under the weight of the shelf and an associated container. This drain or exhaust could be at or near atmospheric pressure. The source 70 can return fluid to a suitable pump for repressurization to the higher pressure.

Container indicator switching structure is provided for lowering the cylinder and the shelf when a container is received on the shelf. In a preferred embodiment, the switching structure includes a valve 76 which has at least two positions. In one position, the valve connects the path 58 to the high pressure source 56 through a high pressure path 72. In a second position, the valve 76 connects the path 58 to the low pressure source 70 through a low pressure path 74. Actuation of the valve 76 can be provided by suitable structure which senses the presence of the container. In one embodiment, a switch arm 80 is associated with the surface of a shelf, whereby a container transferred to the shelf will strike the switch 80 to actuate the valve from a connection to the high pressure source 56, to a connection to the lower pressure source 70. This will provide a lowering signal to the associated cylinder 52 when a container is received on the shelf.

The high pressure source and low pressure source can operate at various pressures. The precise pressures will largely depend on the weight of the container and the associated weight of the shelf, as well as the mechanical characteristics of the components, particularly the fluid-operated raising structure. The low pressure source 70 can be an exhaust or drain for the high pressure fluid from the cylinder 52. The flow of fluid entering the low pressure source 70 from the cylinder 52 can be controlled by the use of a flow valve, such as a needle valve, or by the pressure of the low pressure source 70 to control the rate at which the container is lowered. This will help to prevent jarring and vibrations, particularly where heavy containers are present. Fluid leaving the cylinder 52 can exit through the port 60. It may be desirable to meter some fluid through a port 82 to the opposite side of the piston to facilitate the lowering process. Other fluid connections are also possible.

A transfer stop is operatively connected between each shelf and the next lower shelf. The transfer stop prevents the lowering of a shelf to the discharge position unless the next lower shelf is in the receiving position. A presently preferred embodiment of the transfer stop includes a movable transfer stop member 90. The transfer stop member 90 is adapted to contact a portion of the shelf to prevent the shelf from pivoting to the discharge position, and to be moved from engagement with the shelf when the next lower shelf is prepared to receive a container. The transfer stop member 90 can be pivotally mounted to a fixed object such as the support posts 28, 29. A support 94 can be fixed to the support posts 28, 29 to provide a fixed surface for mounting the transfer stop member. The transfer stop member 90 is preferably pivotally mounted on the support 94. In a preferred embodiment, a cam plate 98 is provided which is fixed to the shelf and thereby pivots with the shelf. An abutment portion 100 of the cam plate 98 is adapted to engage a first seat 102 of the transfer stop member to prevent the shelf from pivoting to the discharge position.

The transfer stop member is actuated according to the position of the next lower shelf to move out of engagement with the first abutment portion 100 so as to permit the upper shelf to pivot downwardly to the discharge position. This will occur only when the next lower shelf is in the upwardly tilted, receiving position. In a preferred embodiment, a connecting rod 106 is attached to the transfer stop member 90 and to the next lower shelf. The connection to the next lower shelf can be through any suitable structure, such as the connecting arm 110 which is fixed to and extends upwardly from each shelf. A pin in the connecting arm can be engaged to a slotted fitting 112 of the connecting rod 106 to permit sliding movement. Pivoting of the next lower shelf to the upwardly tilted, receiving position causes rearward movement of the connecting arm 110 and similar movement of the connecting rod 106. The transfer stop member 90 is moved out of engagement with the abutment portion 100 of the cam plate 98, to permit downward movement of the shelf to the discharge position. A second seat 116 can be provided on the transfer stop member 90 which can be engaged to provide the lower limit of movement of the shelf in the discharge position.

Some downward pivoting of the shelf can occur when a container has been received, such that the container is stored in an intermediate storage position. The orientation of the first abutment portion 100 of the cam plate 98 to the first seat 102 of the transfer stop 90 can be such that downward pivoting of the shelf will occur prior to contact between the first abutment portion 100 and the first seat 102.

A transfer stop spring 118 can be utilized to urge the transfer stop member 90 into engagement with the cam plate 98. Preferably, downward movement of the shelf will cause contact between the transfer stop 90 and a cam surface 119 of the cam plate 98 to provide a smooth transfer to the discharge position.

A second abutment portion 120 of the cam plate 98 can be utilized to limit upward movement of the shelf during the raising process. The second abutment portion can contact a fixed object, which preferably is a portion 124 of the transfer stop member 90, to limit the upward movement of each shelf.

Latching structure is preferably provided to secure the shelf in the receiving position until a container has been fully received on the shelf. The latching structure can take several alternative forms. In a presently preferred embodiment, a latch arm 130 is pivotally mounted to each shelf, as about a pivot pin 136. A latch seat 140 can be fixed to the support 94 such that, when the shelf is in the receiving position, a dog-leg portion 142 of the latch arm 130 rests on the latch seat 140 to support the shelf in the receiving position. A latch spring 144 can be provided to urge the dog-leg portion of the latch arm into engagement with the latch seat 140. A portion of the latch arm 130 extends above the shelf, and a cross bar 148 can extend transversely over a rear portion of the shelf. A container that has been fully received onto the shelf will strike the cross bar 148 and pivot the latch arm 130 out of engagement with the latch seat 140. This will permit the shelf to pivot downwardly to the intermediate storage position wherein the abutment portion 100 of the cam plate 98 rests on the first seat 102 of the transfer stop member 90.

In operation, the bottom-most shelf 20 will have a container and is caused to pivot downwardly by operation of a suitable control mechanism such as the solenoid 150. The solenoid 150 operates to pivot the transfer stop 90 to release the shelf 20, which will pivot downwardly to the discharge position to discharge the container from the tower. A fixed exit ramp 154 can be provided to direct the container onto a conveyor or other structure.

Figure 2A:
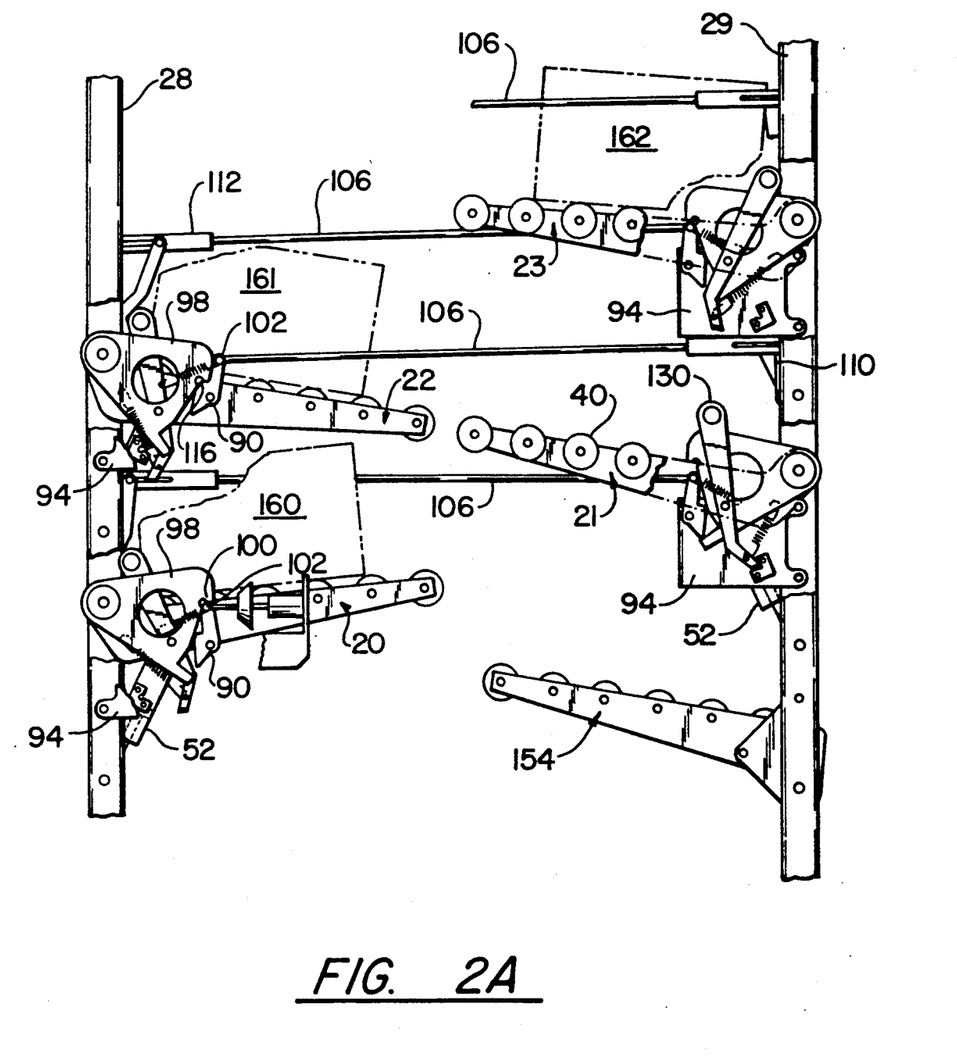
Figure 2B:
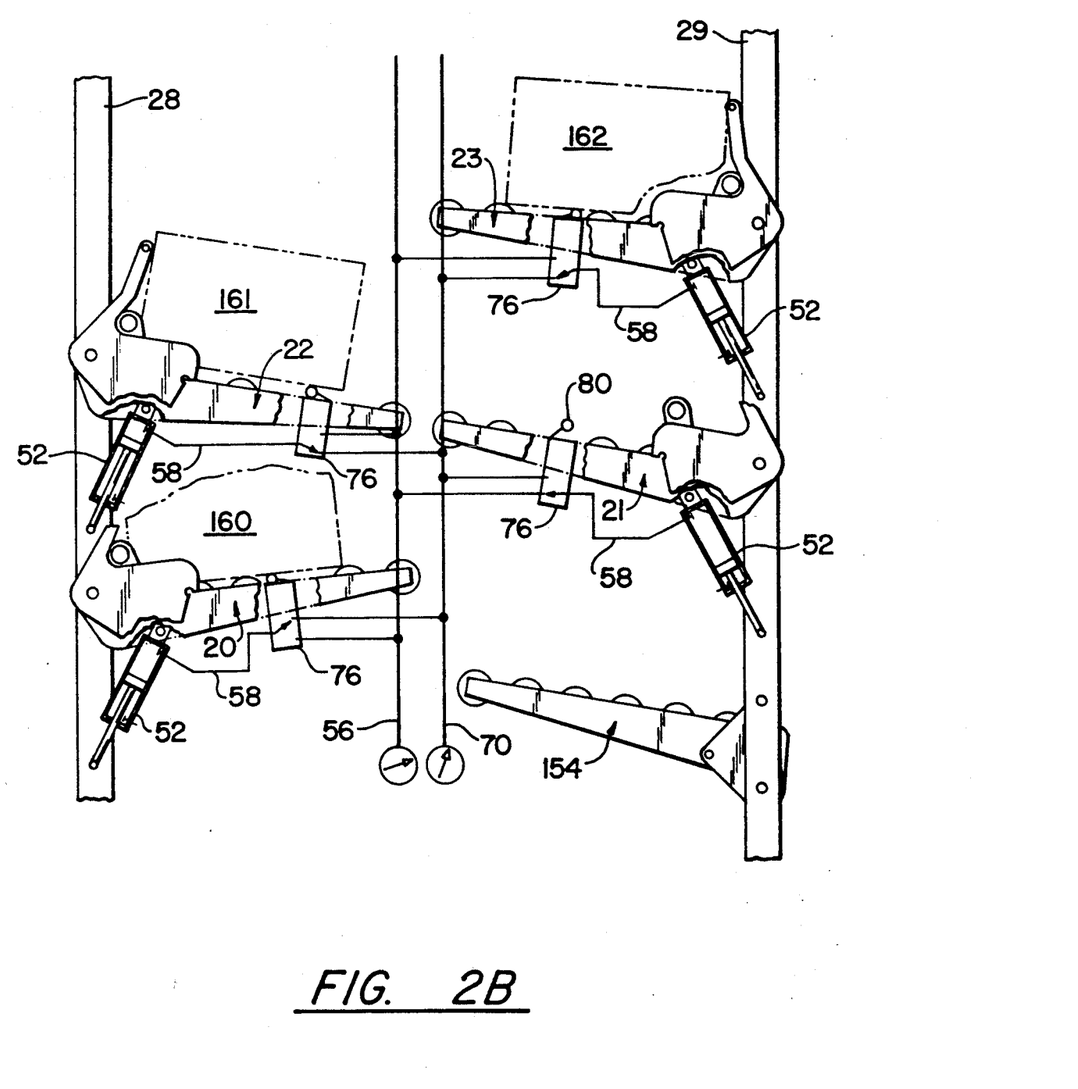

Following the discharge of the container, the switch member 80 will be released and the valve 76 will be actuated to connection with the high pressure source 56. High pressure fluid will be applied through the path 58 to the cylinder 52 to extend the cylinder and raise the shelf 20 to the position shown in FIG. 1-B. The dog-leg portion 142 of the latch arm 130, under the influence of the latch spring 144, will be moved into engagement with the latch seat 140 to secure the shelf 20 in the receiving position. Upward pivoting of the shelf 20 will cause corresponding rearward movement of the connecting arm 110 and connecting rod 106 (FIG. 1A). The transfer stop member 90 associated with the shelf 21 will be pivoted such that the first seat 102 will be moved from engagement with the abutment portion 100 of the associated cam plate 98. The shelf 21 will pivot downwardly under the weight of container 160 until the abutment portion 100 contacts the second seat 116 of the transfer stop member 90, which defines the lower limit of the discharge position. The container 160, when received fully on the shelf 20, will strike the cross bar 148 of the latch arm 130 at the rear of the shelf so as to pivot the latch arm out of engagement with the latch seat 140. Also, the container 160 will contact the switch 80 on the shelf 20 to cause the valve 76 to move to connection with the low pressure source 70. This will drain high pressure fluid from the cylinder 52 to permit the shelf 20 to pivot downwardly to the intermediate storage position in which the abutment portion 100 of the cam plate 98 is in engaged to the first seat 102 of the transfer stop member 90 (FIGS. 2-A, 2 B.)

Discharge of the container 160 from the shelf 21 causes the release of the associated switch 80 and actuation of the valve 76 to connection with the high pressure source 56. The shelf 21 will be raised to the receiving position shown in FIG. 2-A. Pivoting of the shelf 21 to the receiving position will cause movement of the connecting arm 110 and connecting rod 106, to pivot the first seat 102 of the transfer stop member 90 that is associated with the shelf 22 out of engagement with the corresponding abutment portion 100 of the cam plate 98. The shelf 22 will rotate downwardly under the weight of the container 161 to the discharge position in which the first abutment portion 100 of the cam plate 98 contacts the second seat 116. The container 161 will thereby be transferred from the shelf 22 to the shelf 21.

Figure 3A:
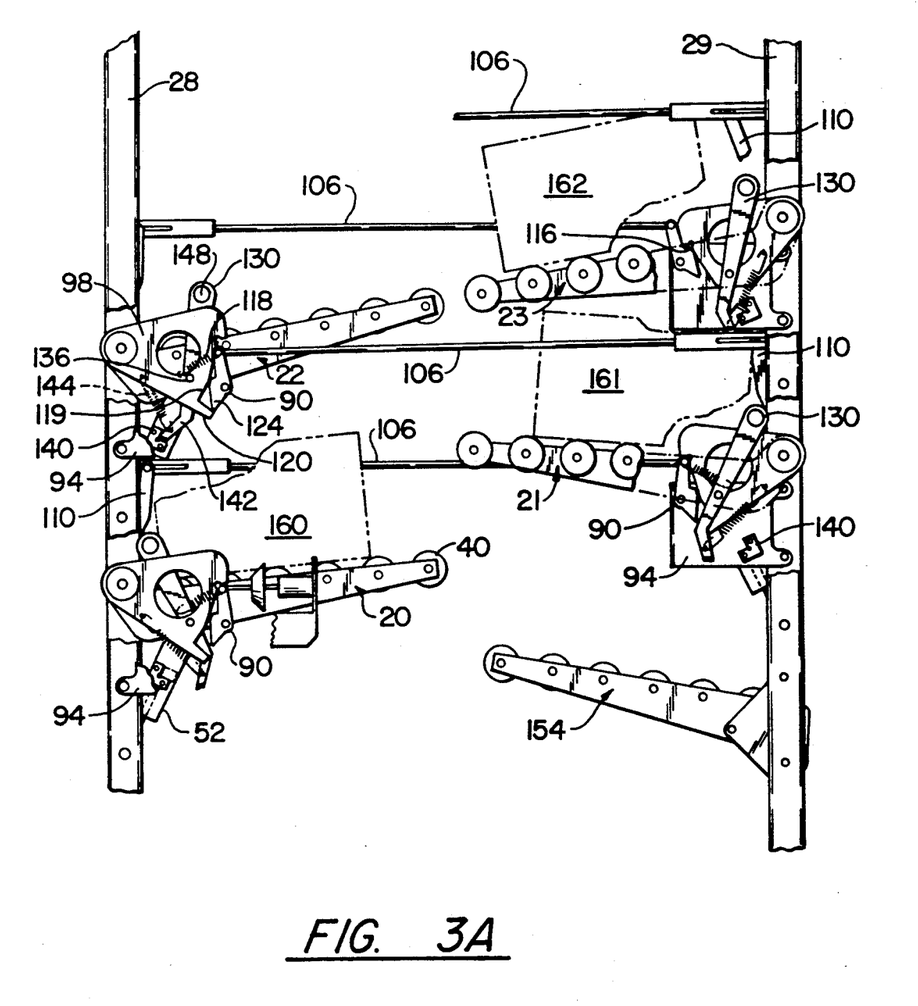
Figure 3B:
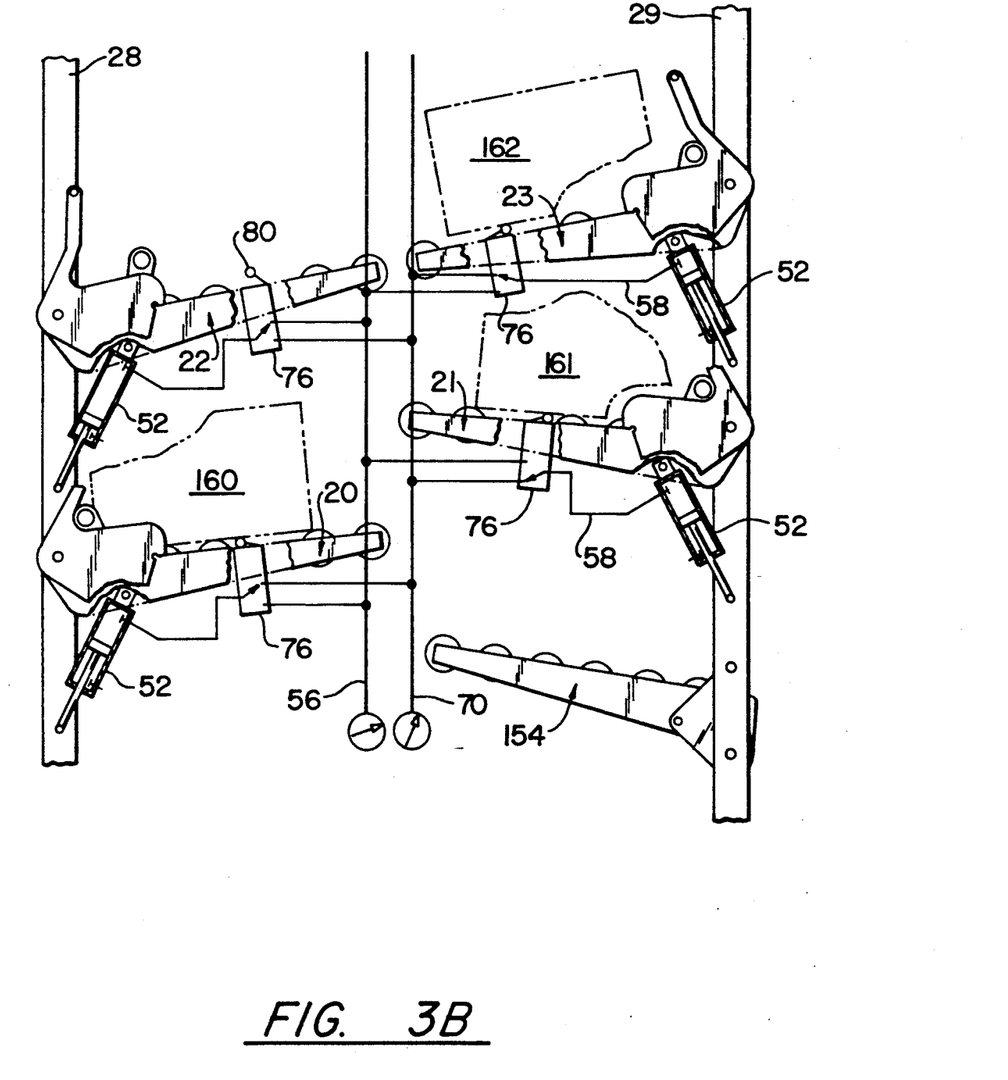

Transfer of the container 161 to the shelf 21 will depress the switch 80 associated with the shelf 21 to actuate the valve 76 to a connection with the low pressure source 70. Also, the container 161 will strike the latch arm 130 to move it out of engagement with the latch seat 140 (FIG. 3-A). These conditions will permit downward pivoting of the shelf 21 to the intermediate storage position. Removal of the container 161 from the shelf 22 will release the switch 80 associated with that shelf and connect the corresponding valve 76 to the high pressure source 56. This will raise the shelf to the receiving position shown in FIG. 3-A. Movement of the corresponding connecting rod 106 will cause the shelf 23 to pivot downwardly to the discharge position to transfer the container 162 to the shelf 22.

The above-described process will continue up the tower until all containers have been transferred downwardly through the tower to the lowest available shelf. Similarly, containers loaded at the top of the tower will be transferred downwardly through the tower to the lowest available shelf.

The invention can take many alternative forms. The connecting rod 106, for example, can be replaced by corresponding electrical or fluid-operated control apparatus. The latch arm can be constructed according to several alternative designs which will accomplish this function. The cam plate and transfer stop member can likewise be modified to many designs, or replaced with alternative structure which will perform the necessary functions described herein.

The precise dimensions of the components are selected for the particular containers that are to be stored in the tower. The shelves preferably pivot upwardly and downwardly approximately 10 degrees from the horizontal, while the intermediate storage position preferably defines an angle of approximately 5 degrees upward from the horizontal. Operating pressure of 80 psig for the high pressure and 50 psig for the low pressure have been utilized, although pressures for a given application can vary widely. The cylinder 52 can have an inside bore of approximately 1½", although this also will vary widely with the particular application.

The invention can take several alternative forms without departing from the spirit or essential attributes thereof, and accordingly, reference should be had to the following claims, rather than to the foregoing specification, as indicating the scope of the invention.

I claim:

1. A container storage and retrieval apparatus, comprising;
   opposing stacks of vertically staggered shelf assemblies, each shelf assembly comprising:
   a shelf pivotally mounted to a support structure and movable between at least an upwardly tilted, receiving position and a downwardly tilted, discharge position;

fluid-operated structure for raising the shelf between at least the downwardly tilted, discharge position and the upwardly tilted receiving position;

a higher pressure fluid source and a lower pressure source;

container indicator switching structure for connecting said raising structure to the higher pressure fluid source if a container is not present on said shelf and to the lower pressure source if a container is present on said shelf; and transfer control structure operatively connected between the shelf and the next lower shelf, and adapted to prevent the lowering of the shelf to the discharge position unless the next lower shelf is in the receiving position.

2. The system according to claim 1, wherein said transfer control structure comprises a movable transfer stop member associated with the shelf, the transfer stop member in a first position being adapted to prevent the lowering of the shelf, and in a second position to permit the lowering of the shelf, said transfer stop member being moved between said first and second positions according to the position the next lower shelf.

3. The system according to claim 1 further comprising a connecting member operatively connected between each shelf and the next lower shelf, said connecting member being adapted to move the transfer stop member to the second position when the next lower shelf is in the receiving position, and to the first position when the next lower shelf is not in the receiving position.

4. The system according to claim 2, wherein said container indicator structure comprises a valve having at least two positions, said valve being actuated by a switch associated with said shelf, said switch being positioned such that the reception of a container on the shelf will actuate said switch and said valve, and cause said valve to move from the higher pressure connection to the lower pressure connection.

5. The system of claim 4, wherein said transfer control structure comprises a cam plate operatively connected to the shelf, said cam plate having an abutment portion adapted to engage a first seat on said transfer stop member when said transfer stop member is in the first position to prevent lowering of said shelf to the discharge position.

6. The system of claim 5, wherein resting of said abutment portion member defines an intermediate storage position of said cam plate on said first seat of said transfer stop.

7. The system according to claim 5, wherein said transfer stop member comprises a second seat portion adapted to engage said abutment portion of said cam member to define a lower limit for the discharge position.

8. The system according to claim 6, wherein said cam plate comprises a second abutment portion adapted to engage a fixed stop to define an upper limit of movement of said shelf in the receiving position.

9. The system according to claim 8, wherein said fixed stop comprises a portion of said transfer stop member.

10. The system according to claim 1, further comprising a latch for securing said shelf in said receiving position until a container is received on said shelf.

11. The system according to claim 10, wherein said latch comprises a latch arm pivotally mounted relative to said shelf and engagable to a fixed latch seat, said latch arm engaging said seat when said shelf is in the receiving position, said latch arm further comprising an abutment portion and being contacted by a container when a container is received on the shelf to remove said latch arm from said seat and permit lowering of said shelf.

12. The system according to claim 11, wherein said transfer stop member is pivotally mounted to a support plate fixed to said support structure, and said latch seat is fixed to said support plate.

13. The system according to claim 1, wherein said fluid-operated raising structure is pneumatic.

14. The system according to claim 13, wherein said fluid-operated raisin structure is a pneumatic cylinder.

15. The system according to claim 1, wherein said fluid-operated raising structure is hydraulic.

16. The system according to claim 1, wherein said transfer stop defines an intermediate storage position.

17. The system according to claim wherein said lower pressure source comprises a fluid drain.

18. The system according to claim 1, wherein said lower pressure supply comprises an exhaust at atmospheric pressure.

* * * * *